United States Patent [19]

Clarke et al.

[11] Patent Number: 5,562,966

[45] Date of Patent: Oct. 8, 1996

[54] METHOD OF APPLYING OXIDATION RESISTANT COATING ON CARBON FIBERS

[75] Inventors: William A. Clarke, Irvine; David A. Eitman, Huntington Beach, both of Calif.

[73] Assignee: Science Applications International Corporation, San Diego, Calif.

[21] Appl. No.: 492,967

[22] Filed: Mar. 12, 1990

Related U.S. Application Data

[63] Continuation-in-part of Ser. No. 303,497, Jan. 27, 1989, abandoned.

[51] Int. Cl.$^6$ .................................. B32B 5/12; B05D 5/12
[52] U.S. Cl. ...................... 428/113; 428/224; 428/297; 428/524; 427/113; 427/219
[58] Field of Search ................................. 428/113, 224, 428/297, 524; 427/113, 219

[56] References Cited

U.S. PATENT DOCUMENTS

| | | | |
|---|---|---|---|
| 4,293,598 | 10/1981 | Hortman et al. | 428/524 X |
| 4,579,773 | 4/1986 | Cole et al. | 428/474.7 X |
| 4,737,402 | 4/1988 | Harpell et al. | 428/297 X |
| 4,822,870 | 4/1989 | Restaino | 428/473.5 |

OTHER PUBLICATIONS

Jones, L. E. and Thrower, P. A., *Journal de chimie physique*, 184, 1461 (1987).

Rice et al., *Ceramic Engineering Scientific Proceeding* 5, 614–624 (1986).

Janet et al., *Ceram. Eng. Sci. Proc.* 5, 625–642 (1984).

Lewis, D. and Rice, R. W. "Further Assessment of Ceramic Fiber Coating Effects on Ceramic Fiber Composites".

*Primary Examiner*—Peter A. Nelson
*Attorney, Agent, or Firm*—Robert R. Meads

[57] ABSTRACT

Oxidation resistant coatings on carbon fibers are provided. Oxidation inhibitor particles are incorporated into a polymeric sizing coating on carbon fibers to protect the fibers from deterioration and erosion due to oxidation of carbon.

40 Claims, 2 Drawing Sheets

METHOD OF APPLYING OXIDATION RESISTANT COATING ON CARBON FIBERS

This is a continuation-in-part of application Ser. No. 07/303,497 filed 27 Jan. 1989, and now abandoned.

FIELD OF THE INVENTION

This invention relates to a novel method for forming a uniform, heterogenous oxidation inhibitor layer on carbon fibers that protects them from the deterioration and erosion due to oxidation of carbon, and in combination with other oxidation protection systems, provides improved oxidation protection when carbon-carbon, metal matrix or ceramic matrix composites reinforced with such carbon fibers are subjected to high temperatures in an oxidizing environment.

More particularly, the invention concerns a method of incorporating oxidation inhibitor particles into a polymeric sizing coating on carbon fibers from a sizing solution, containing submicron particles of at least one oxidation inhibitor in suspended form.

The invention further relates to the oxidation resistant coatings obtained and carbon fibers protected with such coatings.

BACKGROUND OF THE INVENTION

During the past two decades, carbon fiber-reinforced carbon-carbon composites (also referred to as carbon matrix composites) together with composites in which the matrix is ceramic material or metal ( ceramic and metal matrix composites) have been widely employed for solving difficult aerospace problems; and they show excellent potential for structural uses at high temperatures as lightweight, high performance materials.

In carbon-carbon composites, the carbon matrix is reinforced by carbon fiber incorporated therein. The carbon fibers impart directionally oriented strength, while the carbon matrix holds the fibers together and allows for improved thermal resistance. The composites exhibit high fracture toughness and wear resistance and are extremely stable at high temperatures upwards of 3000K (2727° C.). High temperature applications are, however, severely limited due to their degradation by oxidizing gases. In oxidizing environments at high temperatures carbon readily chemisorbs oxygen and desorbs the carbon oxides formed. This process leads to the erosion of carbon-carbon composites. Mass losses of only several percent lead to the rapid decline of intralaminar properties (see e.g. Eitman, D. A. and W. C. Loomis, "Advanced Oxidation Protection Systems for Structural Carbon-Carbon Composites", AFWAL-7R-86-4069, p 107, September, 1986) The main reason for this is that the thermal expansion between structural carbon fibers and the composite matrix in carbon-carbon composites leads to the opening of an interface during the manufacturing process or during application, whenever the composite is subjected to elevated temperatures. In oxidizing environments, oxidation takes place primarily at such exposed interfaces.

Similar problems limit the practical use of ceramic and metal matrix composites. In oxidizing environments at high temperatures, these composites also undergo rapid degradation, primarily due to oxidation at the fiber-matrix interface.

Conventionally, an external coating is applied to the surface of the different carbon fiber-reinforced matrix systems. In case of carbon-carbon composites, typically a two-layer external coating is employed, wherein the outer layer is usually silicon carbide (SIC) or silicon nitride ($Si_3N_4$). The inner layer is a borate glass sealant precursor, such as boron (B), boron carbide ($B_4C$) or silicon boride ($SiB_6$). Upon oxidation, the outer layer is converted into a silica ($SiO_2$) coating that prevents both the inward diffusion of oxygen and the outward diffusion of the carbon oxides. However, thermal expansion mismatches between the outer layer and the carbon-carbon substrate invariably lead to cracks in the outer layer. The function of the inner boron-rich layer is to form a borate sealant upon oxidation that seals the cracks that open in the outer layer. Although this sealant is required for satisfactory coating performance, most coating failures can be traced to chemical attack of the outer layer by the sealant, separation of the outer layer when the sealant expands on reaction with moisture or mechanical disbonding at the sealant layer-substrate interface.

Another approach is the incorporation of oxidation inhibitors, most commonly boron-rich sealant glass precursors as particulates into the matrix phase. In combination with the above-described external coatings, the substrate inhibitors represent a backup oxidation protection, since upon oxidation the sealant glass precursor particulates form a low melting borate sealant inhibitor that, ideally, should coat and protect both the carbon matrix and the fibers. This secondary oxidation protection is particularly important in the temperature range of about 400° to 900° C. wherein the external crack sealant is prone to failure. The usefulness of internal substrate inhibitors is, however, questionable since it is difficult to get the sealant glass precursor particulates within yarn bundles where they should form fiber protecting sealants. Moreover, the oxidation inhibiting sealant glass must have a special combination of properties to protect both the matrix and the fibers. It must cover exposed carbon in the matrix and fibers, i.e. it has to be able to wet carbon. Due to the very low surface energy of carbon for proper wetting the sealant glass must have an even lower surface energy; therefore, the choice of applicable materials is strongly limited. The only chemicals with the desired properties are borate glasses that are liable to absorb moisture. This can lead to coating failure caused by swelling of the glass or by the sudden release of steam upon heating the composite.

Since recent experimental results have indicated that the rate of fiber oxidation in carbon-carbon composites is a significant contributor to the oxidation of the composites, the oxidation protection of fibers is in the center of interest. The effect of boron doping on carbon fiber microstructure and reactivity is discussed by Jones et al., "The Effect of Boron on Carbon Fiber Microstructure and Reactivity", *Journal de Chemie-Physique*, January 1988. The authors found that low boron concentrations decrease the oxidation of carbon fibers considerably; however, their study did not extend to the investigation of the influence of boron dopant on mechanical and physical properties. Moreover, boron doping is carried out with special equipment, under ultra-pure conditions, and at high temperatures (2773K); hence, this technique is expensive and is not compatible with normal fiber manufacturing and finishing technology.

Another way Of providing oxidation protection is the deposition of an oxidation resistant coating on the fiber surface, e.g. by chemical vapor deposition (CVD). The CVD of a continuous coating directly upon a carbon (or ceramic) fiber surface produces thermal expansion incompatibility between the fiber and the applied refractory coating material [particularly when high strength, polyacrylonitrile (PAN) based carbon fibers are used)], which is expected to form cracks from the thermal stress produced during cool down in case of high temperature (1400° to 1650° C.) coatings. The use of CVD is also limited by the inherent chemical reaction stoichiometry requirements for consistent vapor deposition of the same coating. For better performance, multiple layers of different inhibitors can be produced by CVD while the deposition of mixtures of different inhibitors within a common layer is very difficult to produce. An additional disadvantage of chemical vapor deposition is its inherently high cost due to the need of high temperature vacuum reactor operating equipment. Thus, the integration of this step into a fiber manufacturing process is difficult and rather expensive.

The deposition of oxidation resistant coatings by direct chemical reaction is, for example, described in the following publication: Smith, W. D., "Boron Carbide Fibers from Carbon Fibers", *Boron and Refractory Borides*, Springer-Verlag Berlin, Heidelberg, N.Y., 1977. Chemical conversion reaction coatings produced by a direct chemical reaction with the surface of carbon fibers reduce the strength of the fibers by chemically altering the carbon fiber surface and are, therefore, of limited use.

In view of the above literature survey it is apparent that more satisfactory means of protecting carbon fibers and their interface with a matrix are necessary to prevent rapid degradation at high temperatures in oxidizing environments and thereby to exploit the full potential of carbon fiber-reinforced carbon-carbon, metal matrix and ceramic matrix composites.

SUMMARY OF THE INVENTION

We have surprisingly found that by suspending submicron particles of an oxidation inhibitor in a sizing solution routinely used in the finishing process of carbon fibers, the oxidation inhibitor particles can be evenly distributed on the fiber surface and that the coating obtained provides excellent oxidation protection while maintaining the weavability and braidability of the fibers.

In the conventional fiber finishing process, "sizing" is the application of a coating of a matrix-compatible polymer to the fiber surface to provide enhanced fiber handleability and processability in the subsequent compositing processes. Fiber sizes are typically applied from dilute solutions of the desired polymeric material, e.g., epoxides, thermoplastics, polyimides, phenolics, etc. The fiber is immersed in a dilute solution of the polymer in an appropriate solvent which serves as a vehicle for applying the polymeric material. By appropriate choice of solvent and concentration, thin, uniform coatings of the polymeric material can be produced on the fibers without fusing the fibers together.

The invention relates to a method of incorporating oxidation inhibitor particles into a polymeric sizing coating on carbon fibers, comprising contacting the carbon fibers with a uniform suspension of submicron particles of at least one oxidation inhibitor in a sizing solution, removing the coated fibers from the sizing solution, and removing the residual solvent, whereby an oxidation resistant coating comprising a uniform dispersion of the submicron oxidation inhibitor particles is formed on the surface of the carbon fibers.

The incorporation of the oxidation inhibitor particles into the fiber sizing coating allows the additives to be uniformly applied over the carbon fiber surface. During the carbon-carbon or metal or ceramic matrix composite processing the finely divided oxidation inhibitor particles present in the sizing coating form a heterogeneous oxidation inhibitor layer around the carbon fiber. When the composite is subjected to oxidation applications at temperatures higher than about 427° C., the carbon fiber composite reinforcement is afforded a higher oxidation resistance due to the formation of an oxide barrier layer. This heterogenous oxide layer also interacts with the oxidation inhibitor matrix additives which may help stabilize the oxide coating. The coating stability is aided in some cases by the matrix chemistry, where the volatilization of boron oxide from coating oxidation may be inhibited by the boron oxide present in the matrix. Further, the oxidation inhibitor coating according to the invention also interacts with the total oxidation protection system of the composite, including the external coating and eventual carbon porosity coatings to further enhance the total oxidation protection system.

The invention further relates to oxidation resistant coatings comprising a uniform dispersion of submicron particles of at least one oxidation inhibitor in a polymeric layer on the surface of a carbon fiber.

When the initial coating is pyrolyzed during the composite processing, the coating affords the opportunity for the carbon fiber to be protected by layers of oxidation inhibiting materials (such as boron carbide).

In another aspect, the invention relates to the oxidation resistant carbon fibers having such oxidation resistant coatings deposited thereon.

DETAILED DESCRIPTION OF THE INVENTION

1. Definitions and General Methods

Figure 1:
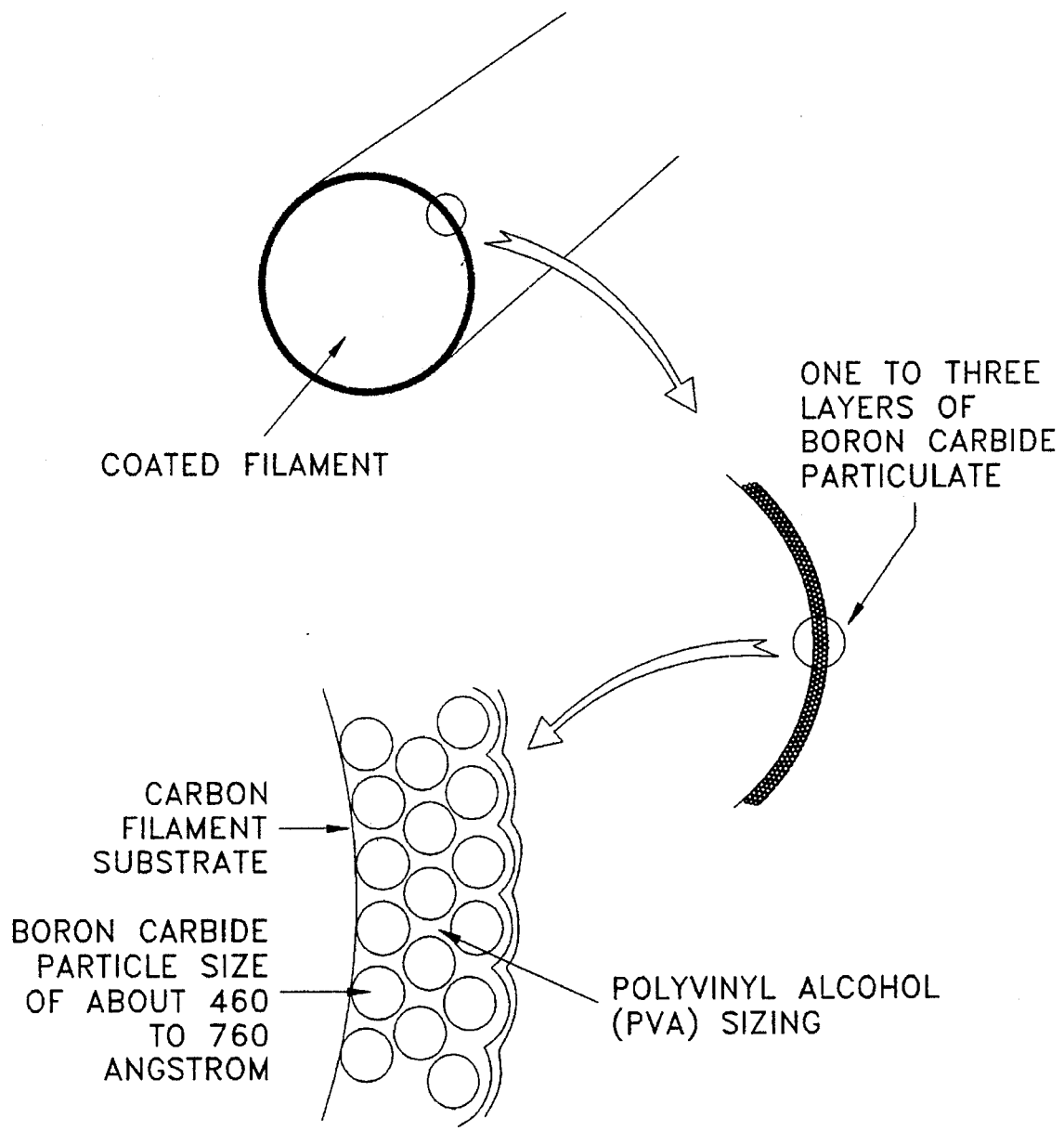
FIG. 1 is an illustration of a typical carbon fiber coating process according to the invention.

A method of incorporating oxidation inhibitor particles into a sizing coating on carbon fibers is provided.

The term "oxidation inhibitor" is used in the broadest sense, and refers to any oxidation inhibitor known in the art of structural graphite materials, in particular carbon-fiber reinforced carbon-carbon, ceramic matrix and metal matrix composites, or to any material discovered hereinafter, and suitable for inhibiting the oxidation of such materials, provided that it can form a uniform suspension in a sizing solution, and forms a heterogenous coating layer around the carbon fiber when applied and used in accordance with the present invention. The term "oxidation inhibition" is used to indicate that the oxidation of carbon fibers or, when incorporated into the above-mentioned composites, of the fiber-matrix interfaces and thereby of the entire composite, is prevented or decreased. The mechanism of oxidation inhibition may be different for different oxidation inhibitors. The present invention is not limited to a particular mechanism of oxidation inhibition.

Suitable oxidation inhibitors include, for example, oxides, such as zirconium oxide, carbides, such as silicon carbide (SIC), which forms a renewable $SiO_2$ diffusion barrier and is stable in the presence of moisture. Aluminum carbide ($Al_4C_3$), chromium carbide ($Cr_{23}C_6$ or $Cr_3C_2$) and rare earth carbides are also known, although less investigated, oxidation inhibitors. Boron carbide ($B_4C$) acts as a borate glass sealant precursor, i.e. upon exposure to oxygen forms a sealant glass around the carbon fiber to be protected. A further boron compound that can be used as a sealant former oxidation inhibitor is boron nitride. The anisotropic thermal expansion characteristics of this compound offer a very good thermal expansion match with carbon fibers. A further class of sealant glass precursors includes borides, e.g. zirconium diboride ($ZrB_2$) and silicon boride. Nitrides other than boron nitride, e.g. silicon nitride ($Si_3N_4$) are also known inhibitors of carbon oxidation having similar properties to those of SiC. Diamond can also be employed as oxidation inhibitor. Each of these materials are commercially available products.

A preferred oxidation inhibitor is diamond alone or in combination with other oxidation inhibitors.

A preferred class of oxidation inhibitors includes boron carbide, silicon carbide, zirconium diboride, boron nitride, silicon boride, zirconium oxide and mixtures thereof.

Another, particularly preferred, oxidation inhibitor is diamond. Diamond prevents the coated fibers from laser penetration and consequential oxidation by light-scattering. Other materials with similar properties may also be useful in practicing the present invention.

The term "sizing" as earlier mentioned, is used to refer to the application of a coating of a matrix-compatible polymer to the fiber surface, to provide enhanced handleability and processability in the subsequent steps of the fiber finishing and compositing process. "Sizing coatings" are the results of this process that are employed from a "sizing solution" which is typically a dilute solution of the desired polymeric material. Applicable polymeric materials include epoxides, thermoplastic polymers, polyimides, phenolic polymers but are not restricted to these categories. The solvent can be any solvent suitable for dissolving the desired polymer, for example alcohols, e.g. ethyl, methyl or isopropyl alcohol.

According to the invention, submicron particles of at least one oxidation inhibitor are suspended in a sizing solution containing a dilute solution of an appropriate polymeric material in a suitable solvent. The carbon fibers to be protected are immersed in the thus obtained solution/suspension. Since sizing lubricates the surface of carbon fibers, the oxidation inhibitor particles suspended in the sizing solution will be in close proximity to the fiber surface. After removal of the carbon fibers from the sizing solution, the excess of the solvent is removed leaving a thin polymeric film containing a uniform dispersion of oxidation inhibitor particles on the surface of each fiber.

The thickness of the polymeric coating containing the oxidation inhibitor particles typically is between about 400 and 2500 angstrom, preferably between about 600 and about 1800 angstrom. These thickness data usually correspond to one to three particles, the typical particle size being between 460 and about 760 angstrom.

The sizing solution may also incorporate surfactants, such as Darvan 821-A, Ammonium Dispersing Agent for Ceramic Bodies (R. T. Vanderbilt Co., Inc.), to promote the formation of an even suspension of the oxidation inhibitor particles. The sizing coating may be overcoated by an external lubricant, such as polyethylene glycol (PEG) or any other available lubricant to further enhance the weavability and braidability of the carbon fibers. PEG may be applied as an additional coating on top of the sizing layer containing a dispersion of the oxidation inhibitor particles, for example from a hot alcohol or hot melt state. Its thickness usually is from 600 to 1800 angstrom. An additional polymer coating, such as polyethylene (PE) coating may also be used to provide enhanced weavability an braidability, usually in a thickness of from about 600 to 1800 angstrom.

The method according to the invention further includes the preparation of combination oxidation inhibition coatings on carbon fibers. The first coating is applied to the fiber surface from a sizing solution as hereinabove described followed by the deposition of a second coating by the same technique or any other literature known technique, e.g. CVD. Multiple-layer structures may be prepared in an a analogous manner.

The carbon fibers typically are several µm thick. Commercially available polyacrylnitrite (PAN)-based fibers have diameters ranging from about 4.4 µm to about 7.0 µm. Pitch fibers are usually abut 10.0 µm in diameter and the rayons are about 8–8.5 µm. The thickness of the Amoco T40R fibers is, for example, 5 µm, while the Amoco T300 fibers are 7 µm thick. Fiber diameter, per se, has little bearing on the suitability of a fiber for coating or on the performance of a coated fiber in a carbon-carbon composite.

The term "preform" as used throughout the specification refers to the composite fabrications where the matrix is an organic polymer. After pyrolysis the preform is transformed to a carbon matrix composite.

The method according to the invention provides the following major advantages over other prior art methods:

(1) The adding of the oxidation inhibitor material(s) to the carbon fiber sizing solution during manufacturing of the fibers provides a means for applying the additive to the fiber surface thoroughly, in a continuous, even distribution.

(2) When abrasive oxidation inhibitor particles are used, such as boron carbide or silicon carbide submicron particulates, the concentration of the sizing solution can be adjusted to lubricate the abrasive particulates. As a result, the fibers can be woven with minimal fiber damage due to the abrasive oxidation inhibitor particles. The damaging effect of abrasive oxidation inhibitors on carbon fibers is further minimized by employing an additional external lubricant (PEG or PE) coating on top of the sizing coating, whenever desired.

(3) Since sizing, and hence application of the oxidation inhibitors on the carbon fibers, takes place before the fibers are woven and braided, the oxidation inhibitor forms a uniform coating around the entire fiber, including areas within the fiber preform that are not easily accessible for coating after weaving or braiding.

(4) By the method according to the invention mixtures of oxidation inhibitor additives can be used without being limited by the stoichiometry requirements of CVD coatings. Also the cost of this approach is significantly less than that of CVD techniques. Further, this approach is easily incorporated into the conventional carbon fiber manufacturing processing.

(5) The heterogenous refractory metal oxide layer that is created on the carbon fibers during high temperature oxidation applications does not have the thermal expansion incompatibility of a continuous coating. This will minimize thermal stress that would lead to cracking of the coating.

(6) If, due to the discontinuity of the layer, flaws enhancing oxidation occur, the coating applied according to the invention can be overlayered with another, e.g. CVD layer that seals any flaws or discontinuities in the coating surface.

(7) The sizing-derived oxidation resistant coatings can interact with other carbon matrix oxidation inhibitor systems, to help stabilize the coating oxide layer.

2. Description of Preferred Embodiments

Oxidation inhibitors are preferably selected from the following chemicals:

boron carbide,
silicon carbide, zirconium diboride, a mixture of the above constituents, boron nitride, silicon boride, zirconium oxide (yttrium oxide or calcium oxide stabilized)

combination coatings where boron nitride or boron carbide are deposited first followed by an overcoating of silicon carbide or silicon boride particulate or chemical vapor deposition coating, diamond alone or in combination with one or more of the above-listed oxidation inhibitors.

All oxidation inhibitors are used in submicron sizes. In case of boron carbide it was found to be particularly advantageous when the majority of particles had a diameter of from about 460 to about 760 angstrom.

When a mixture of boron carbide, silicon carbide and zirconium diboride is used, their ratio are preferably 1.28/1/1 or 8/1/11.

A particularly preferred oxidation inhibitor is diamond. Diamond particulate carbon fiber coatings applied from sizing solutions containing a uniform suspension of diamond particles, provide not only oxidation inhibition, but also defend composite structures made with the obtained coated fibers from laser penetration by light scattering. The size of the diamond particulates can be varied to inhibit the desired laser wavelength or range or wavelengths from about 0.035 to about 10.6 microns. The high light scattering and thermal resistance properties of diamond are desirable for laser and consequential oxidation resistance. Additional oxidation inhibitors and other conventional ingredients can be used in combination with the diamond particulates to further improve the matrix properties.

The selected oxidation inhibitor(s) is/are suspended in the carbon fiber sizing solution preferably at a concentration that will allow the carbon fiber surface to be evenly coated with the particulates at about 5 to 10% of the fiber weight.

According to a particularly preferred embodiment of the method of the invention, boron carbide particles having a particle size of about 460 to about 760 angstrom, are suspended in a sizing solution containing about 0.5 to 1% polyvinyl alcohol (PVA) in ethyl alcohol. The boron carbide concentration is about 0.5 to about 1%. Carbon fibers are drawn through this solution continuously, spread apart so that a uniform layer is formed on the whole fiber surface. Although, as earlier mentioned, the fiber diameter is not critical, smaller diameter fibers are generally more handleable without incurring damage and are preferred when subsequent weaving is required. The oxidation inhibitor additive is carried on the fiber surface throughout all fiber tow two- and three-dimensional fiber preform weaving and/or braiding operations. This assures that the oxidation inhibitor additive is carried into the fiber tow "cross over" sites within the woven or braided preform structures.

The sizing solution preferably contains at least one surfactant and optionally an external lubricant.

The boron carbide-containing sizing coating is preferably overcoated with a polyethylene glycol (PEG 1650) wax for providing enhanced lubrication. PEG is applied on the surface of the first layer from a hot alcohol solution or hot melt state. Weavability and braidability may be enhanced by applying a polymer, e.g. polyethylene (PE) coating.

The coated fibers may then be further manufactured, according to the intended use. The principal application for the coated fibers is in the form of a two-dimensional fabric which as a carbon-carbon reinforcement produces better traverse composite properties than laminates made from undirectional reinforcements.

For example, before scanning electron microscopic (SEM) evaluation or testing their mechanical properties, panels are fabricated from the coated fibers according to the invention. The coated fibers may be wound on a rotating drum to produce unidirectional one-dimensional flat sheets that are impregnated with a thermosetting matrix (a phenolic film), optionally containing further oxidation inhibiting materials known in the art. The impregnated fiber sheets are cut into sufficient plies for layup and mold pressing into panels of desired shape and size. The cut plies are then stacked and debulked into so called "carbon-phenolic preforms". The next stage is a resin staging process to protect the fibers from being damaged by the oxidation inhibitor particulates during the subsequent mold pressing operation. Staging consists of a low temperature i(about 40° C.) removal of the solvent residues in vacuum followed by the usual aging of the preforms at higher (about 83° C.) temperatures. The low temperature phenolic resin advancement favors the formation of ether linkages during the chain extension polymerization of the low molecular weight prepolymer consituents which produces a less brittle resin matrix.

After mold pressing of the panels, the next process in the carbon-carbon composite processing is densification of the panels obtained in the phenolic impregnation step. For densification materials known in the art, e.g. coal tar pitch (Allied Chemical 15V) mixture can be used.

The first step in densification is the initial carbonization processing.

After the initial carbonization cycle, the composite has sufficient open porosity for densification processing using impregnation/carbonization/graphitization treatments. Impregnation is conducted using a suitable material for both the supply of carbon and for reasonable processing. Typical densifying resins in use include coal tar pitches which have excellent wetting capabilities, a mixture of furfural and coal tar pitch, which is a gelling thermoset offering ease of processing, and various phenolic resins, which both wet well and do not have large exotherms.

The densification cycles usually consist of several multiple reimpregnation carbonization/graphitization cycles. The rate of temperature rise during carbonization cycle is tailored to avoid excessive pressure buildup in the composite and to permit the generation and escape of pyrolysis gases without mechanical damage. Further, the composite is mechanically restrained during this carbonization heat treatment as well as during initial "graphitization" heat treatment. Graphite tooling plates are used to provide this restraint and maintain dimensional requirements while allowing gases to evolve during processing. The graphitization heat treatment takes place at a temperature of about 1650° C. and is conducted after the second through third carbonization cycles. A temperature of 1650° C. has been selected to permit relief of residual stresses in the composite by creep and to keep the temperature below threshold of reaction of the carbon fiber. Also, this temperature provides the highest mechanical properties.

The carbon-carbon composites can, for example, be used for the fabrication of jet engine nozzle seals, flame holders, etc.

The invention is further illustrated by the following non-limiting example.

3. Example

Preparation of a boron carbide ($B_4C$) particulate coating on carbon yarn filaments.

T40R (3K) yarn filaments (Amoco Performance Products, Inc.) having a diameter of about 5 μm, are spread apart and drawn through a polyvinyl alcohol (PA) sizing solution containing about 5 to 10% boron carbide ($B_4C$) (particle size: about 460–760 angstrom) as a uniform dispersion. The solution also contains Darvan 821-A (D. T. Vanderbilt Co., Inc.) surfactant to facilitate the formation of a uniform and stable suspension. The amount of the "add-on" to the filaments is continually measured and the speed of drawing the yarn filaments through the solution is selected to provide about 1200 angstrom thick coatings.

After removal of the solvent residues, the boron carbide sizing coating is overcoated with a polyethylene glycol (PEG 1650) lubricant, applied from a hot alcohol solution.

Figure 2:
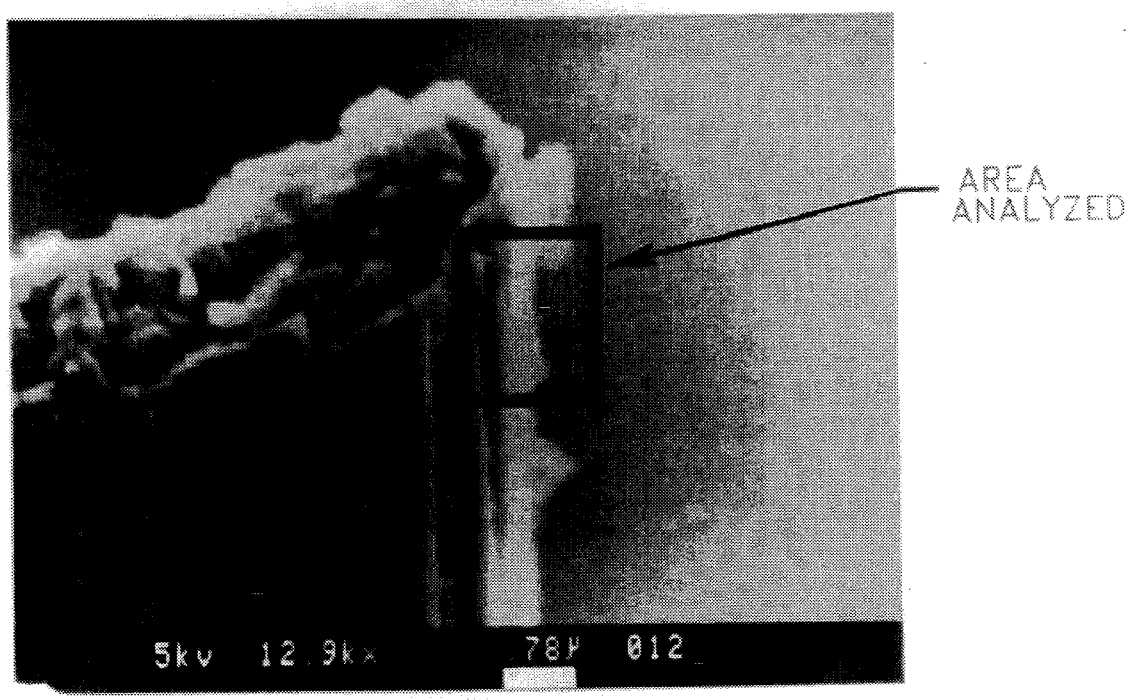
FIG. 2 shows the SEM photograph of a boron carbide layer deposited on a carbon fiber using one process according to the invention.

An SEM photograph of the obtained boron carbide coating shows that the boron carbide particles have a uniform distribution (see FIG. 2). The $B_4C$ particles are 99% pure. The thickness of the layers obtained by this technique is about 1 to 3-times the particle diameters. The weavability of the yarns is satisfactory.

We claim:

1. A method of incorporating oxidation inhibitor particles into a polymeric sizing coating on carbon fibers, comprising contacting said fibers with a uniform suspension of submicron particles of at least one oxidation inhibitor in a sizing solution, removing said fibers from said sizing solution, and removing the residual solvent, whereby an oxidation resistant coating comprising a uniform dispersion of said submicron particles is formed on the surface of said carbon fibers.

2. A method according to claim 1, wherein said oxidation inhibitor is selected from the group consisting of diamond, boron carbide, silicon carbide, zirconium diboride, boron nitride, silicon boride, zirconium oxide and mixtures thereof.

3. A method according to claim 2, wherein said oxidation inhibitor is diamond.

4. A method according to claim 3, wherein said diamond has a particulate size to scatter laser light in the wavelength range from about 0.035 to about 10.6 microns.

5. A method according to claim 4, wherein said diamond is applied in combination with at least one additional oxidation inhibitor selected from the group consisting of boron carbide, silicon carbide and zirconium bromide.

6. A method according to claim 2, wherein said oxidation inhibitor is boron carbide.

7. A method according to claim 6, wherein the particulate size of boron carbide is in the range of from about 460 to about 760 angstrom.

8. A method according to claim 2, wherein said oxidation inhibitor is a mixture of boron carbide, silicon carbide and zirconium diboride.

9. A method according to claim 8, wherein the ratio of boron carbide/silicon carbide/zirconium diboride is about 1.28/1/1.

10. A method according to claim 8, wherein the ratio of boron carbide/silicon carbide/zirconium diboride is about 8/1/11.

11. A method according to claim 1, wherein said sizing solution is a solution of polyvinyl alcohol (PVA) in water.

12. A method according to claim 11, wherein said sizing solution further comprises at least one surfactant.

13. A method according to claim 11, wherein said sizing solution further comprises an external lubricant.

14. A method according to claim 1 or claim 2, further comprising applying at least one additional coating on the surface of said sizing coating containing said oxidation inhibitor particles.

15. A method according to claim 14, wherein said additional coating is a further oxidation resistant coating.

16. A method according to claim 15, wherein a silicon carbide or silicon boride additional coating is applied on the surface of a sizing coating containing boron nitride or boron carbide oxidation resistant particles.

17. A method according to claim 15, wherein said further oxidation resistant coating is applied from a sizing solution.

18. A method according to claim 15, wherein said further oxidation resistant coating is applied by chemical vapor deposition (CVD).

19. A method according to claim 14, wherein said additional coating is a polyethylene glycol (PEG) coating.

20. A method according to claim 19, wherein said PEG coating is applied from a hot alcohol solution.

21. A method according to claim 19, wherein said PEG coating is applied from a hot melt state.

22. A method according to claim 14, wherein said additional coating is a polymer coating.

23. A method according to claim 22, wherein said polymer is polyethylene.

24. A method according to claim 1 or 2, wherein said fibers are contacted with said sizing solution by being drawn through said solution continuously.

25. A method according to claim 24, wherein said fibers are spread apart while being drawn through said sizing solution.

26. Oxidation resistant coating on the surface of a carbon fiber comprising a uniform dispersion of submicron particles of at least one oxidation inhibitor in a polymeric layer.

27. An oxidation resistant coating according to claim 26, wherein said oxidation inhibitor is selected from the group consisting of diamond, boron carbide, silicon carbide, zirconium diboride, boron nitride, silicon boride, zirconium oxide and mixtures thereof.

28. An oxidation resistant coating according to claim 27 wherein said oxidation inhibitor is diamond.

29. An oxidation inhibitor according to claim 28, wherein said diamond has a particulate size to scatter laser light in the wavelength range from about 0.035 to about 10.6 microns.

30. A method according to claim 29, wherein said diamond is applied in combination with at least one additional oxidation inhibitor selected from the group consisting of boron carbide, silicon carbide and zirconium bromide.

31. An oxidation resistant coating according to claim 27, wherein said oxidation inhibitor is boron carbide.

32. An oxidation resistant coating according to claim 31, wherein the particulate size of boron carbide is in the range of from about 460 to about 760 angstrom.

33. Oxidation resistant carbon fiber comprising a polymeric coating deposited on the surface of said fiber, said coating containing a uniform dispersion of submicron particles of at least one oxidation inhibitor.

34. An oxidation resistant carbon fiber according to claim 33, wherein, said oxidation inhibitor is selected from the group consisting of diamond, boron carbide, silicon carbide, zirconium diboride, boron nitride, silicon boride, zirconium oxide and mixtures thereof.

35. An oxidation resistant carbon fiber according to claim 34, wherein said oxidation inhibitor is diamond.

36. An oxidation resistant carbon fiber according to claim 35, wherein said diamond has a particulate size to scatter laser light in the wavelength range from about 0.035 to about 10.6 microns.

37. An oxidation resistant carbon fiber according to claim 36, wherein said diamond is applied in combination with at least one additional oxidation inhibitor selected from the group consisting of boron carbide, silicon carbide and zirconium bromide.

38. An oxidation resistant carbon fiber according to claim 34, wherein said oxidation inhibitor is boron carbide.

39. An oxidation resistant carbon fiber according to claim 38, wherein the particulate size of boron carbide is in the range of from about 460 to about 760 angstrom.

40. Oxidation resistant carbon fiber having a surface coating prepared in accordance with the method of any one of claims 1 to 25.

* * * * *